UNITED STATES PATENT OFFICE.

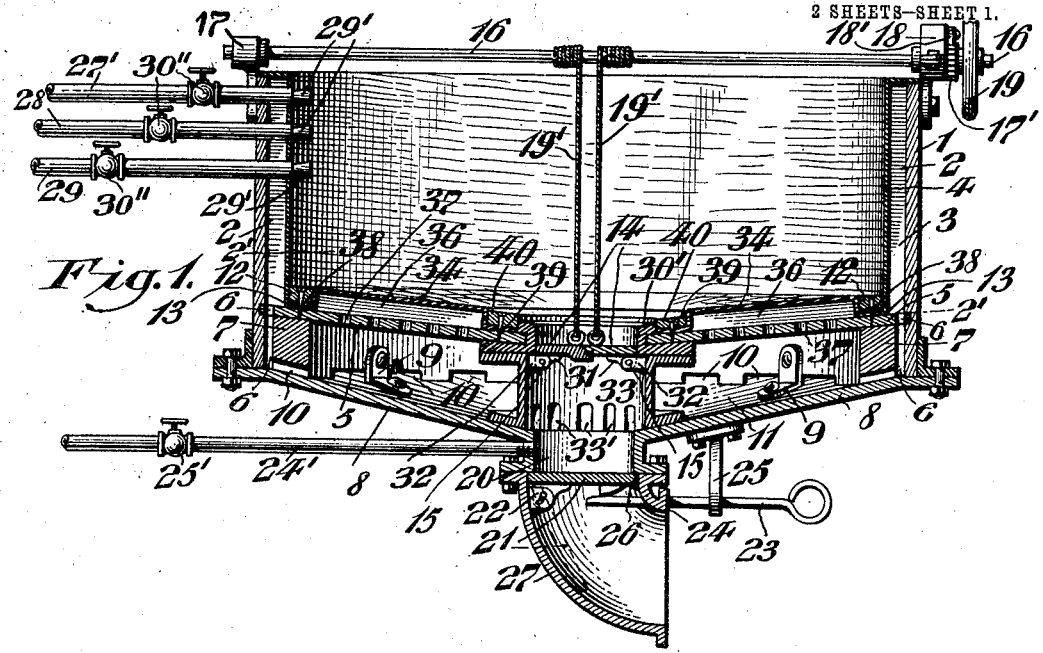
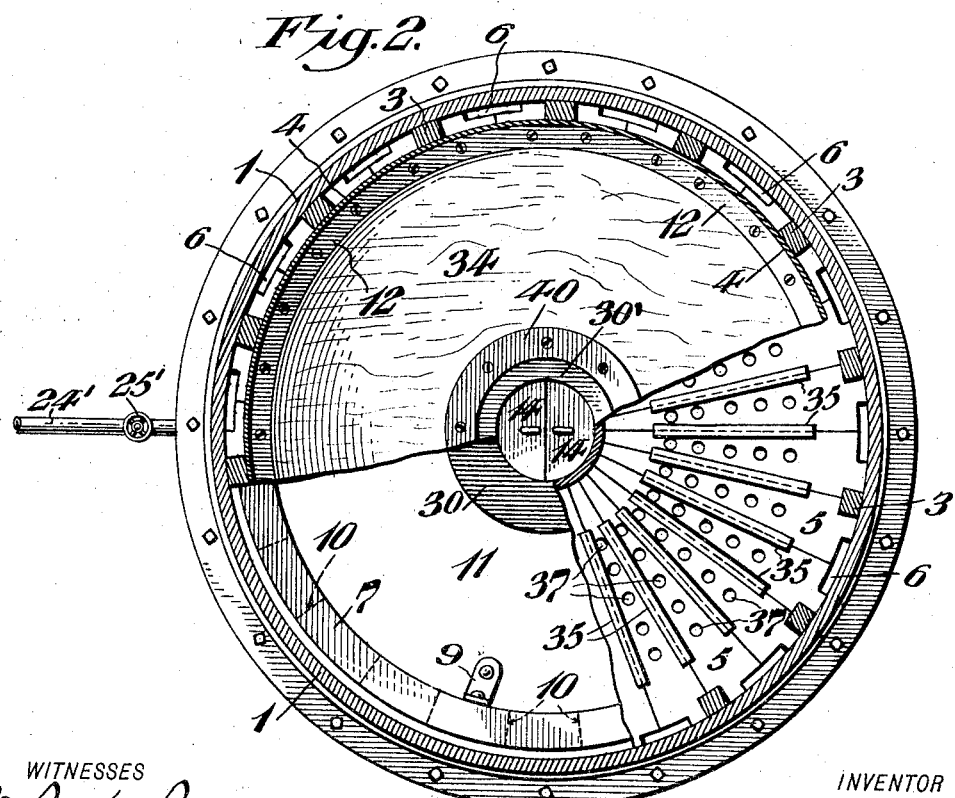

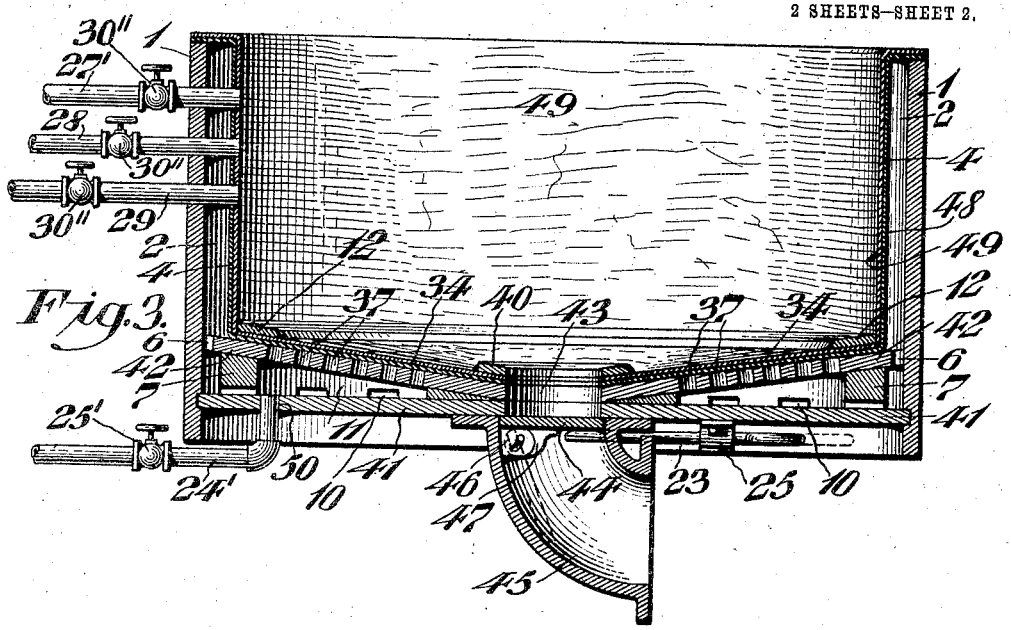
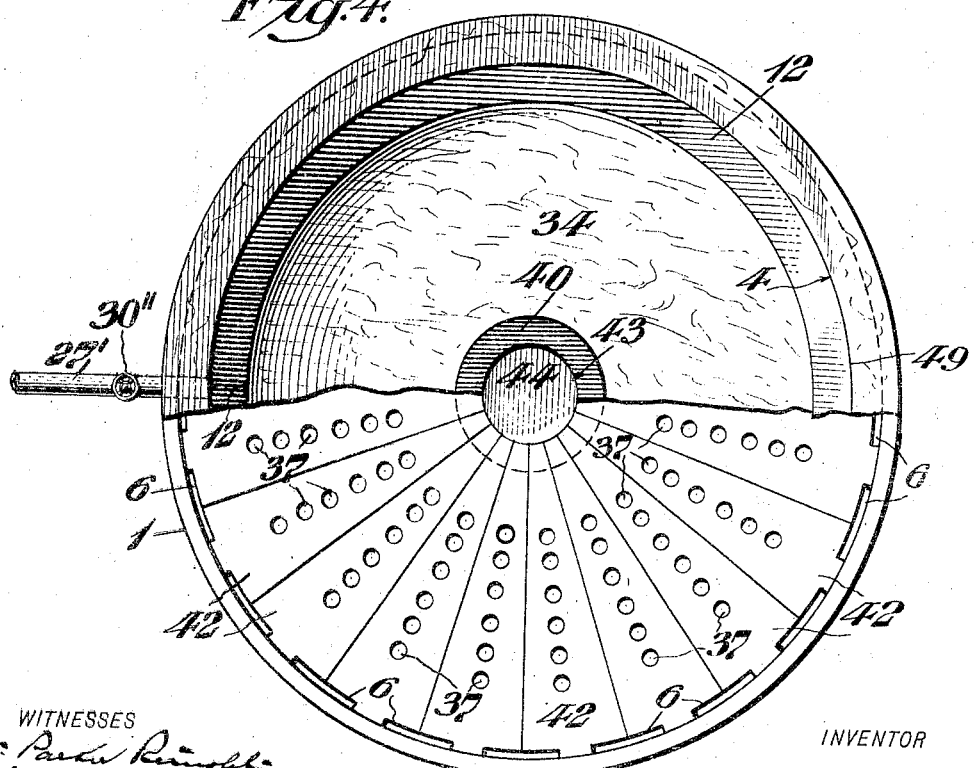

DAVID C. REINOHL, OF WASHINGTON, DISTRICT OF COLUMBIA.

COMBINED SETTLING-TANK AND FILTER.

1,081,515.          Specification of Letters Patent.     Patented Dec. 16, 1913.

Application filed March 7, 1911, Serial No. 612,951. Renewed May 10, 1912. Serial No. 696,503.

*To all whom it may concern:*

Be it known that I, DAVID C. REINOHL, a citizen of the United States, residing at Washington, in the District of Columbia, have invented certain new and useful Improvements in Combined Settling - Tanks and Filters; and I do hereby declare the following to be a full, clear, and exact description of the invention, such as will enable others skilled in the art to which it appertains to make and use the same.

My invention relates primarily to the art of recovering precious metals, such as gold, silver and the like, from their ores, by subjecting the ore in a finely comminuted condition to a solvent, such as cyanid of sodium, cyanid of potassium, or other chemical, for dissolving the metal by contact with the solvent, which is subsequently recovered in any preferred manner.

The invention is directed toward collecting the values, and subsequently disposing of the tailings, has for its object economy in time and labor, and the invention consists in certain improvements in the construction of settling tanks, which will be fully disclosed in the following specification and claims.

In the accompanying drawings, which form part of this specification:—Figure 1 represents a vertical transverse section, partly in elevation, of a tank embodying my invention. Fig. 2 is a plan view taken on line 2'—2', Fig. 1. Fig. 3 is a vertical transverse section of a modified form of tank, and Fig. 4 is a top plan view of the same partly in section.

Reference being had to the drawings and the designating characters thereon, the numeral 1 indicates the body of the tank, preferably cylindrical in form, and made of wood or metal, and of a capacity to collect and contain about one-half of the ore and the solvent used in treating a predetermined quantity of ore. Thus, for a fifty ton plant per day, two tanks of fifty tons capacity will be required. The dimensions of the tank must be varied to suit the capacity of the plant.

2 indicates an annular filter chamber adjacent to the wall of the tank, and is formed by vertical strips 3 of wood of a suitable width and thickness, secured to said walls and properly spaced apart to prevent the filtering wall 4 being pressed against the wall of the tank 1. The wall 4 is preferably made of textile fabric, such as canvas, drilling or the like, whose interstices render it foraminous and allow the liquid to percolate through it.

5 indicates the bottom of the tank, which is provided with passages 6 for the liquid from the chamber 2. The bottom 5 is preferably dished or converging as shown in Fig. 1, is supported on an annular sill 7 in the upper end of a preferably conical or hopper-like extension 8 of the tank; the bottom of the sill being angular or inclined to coincide with the angle of the wall of the extension, to rest thereon without additional support, or it may be provided with brackets 9 suitably spaced apart, when found necessary. The sill is of less diameter than the interior of the tank 1 and forms a continuation of the passages 6, and in the lower side of the sill are passages 10 for the filtered liquid in the chamber 2 to pass through to the chamber 11 within the extension.

The foraminous textile wall 4 of the filter, is secured on the bottom 5, by detachable annular segmental wooden cleats 12, which rest upon a lateral extension 13 of the wall, so that said wall can be removed for repairs or renewal as required.

In the center bottom 5 is a concentrically arranged double drop-valve 14, provided with hinges 15, and supported in its closed position by said hinges and a horizontal shaft 16 which extends across the top of the tank and is supported in brackets 17, 18, secured to the wall of the tank by lag screws, and on the shaft is a hand wheel 19, provided with a ratchet 17', and pawl 18', and cables 19' for raising and lowering said valve 14 as required for discharging the contents of the tank.

At the lower end of the chamber 11 is a passage 20, controlled by valve 21. The valve is supported on hinges 22, and a transverse horizontal rod 23, which extends through the wall of the extension and is supported in the flange 24 and bracket 25, and is withdrawn for opening the valve, and re-inserted when the valve is closed. The valve 21 closes against an annular seat 26.

24' indicates a discharge pipe provided with a stop cock 25' for drawing the filtered solvent freighted with values from the chamber 11, and may be connected to a pump for filtering under a vacuum.

The hopper extension 8 terminates in a discharge conduit 27, which may be extended to any desired length, through which the tailings from the settling tank 1 may be conducted to another tank for further washing to recover the values held in the slimes enveloped in the sands, to a car, a dump heap or any other point for further treatment or deposit.

27', 28, and 29, indicate discharge pipes in the wall of the tank 1, which extend through the filter chamber 2, are provided with suitable plugs 29' at their inner ends and with stop-cocks 30'', and are designed to decant the clarified solvent above the tailings and containing values, and conduct them to the usual zinc shaving-boxes, not shown, in which the values are precipitated, in a manner well known to the art.

The bottom 5, is provided at its center with an annular casting having flanges 30 and 31, as shown in Figs. 1 and 2, and may be provided with a filter wall 34 of like material as the wall 4 and supported on strips of wood 35, to form filter chambers 36, the liquid from which passes into the chamber 11, through a series of openings 37. The filter wall 34 is provided with extensions 38, 39, the former secured by the cleats 12 and the latter by like cleats 40.

The bottom 5 may be supported on an annular double flanged bearing 33 provided with passages 33' for the liquid.

In Figs. 3 and 4, I have shown a modification of the invention especially adapted to the reconstruction of the present form of tanks to equip them with the present invention, and in which 41 indicates the flat bottom of a tank over which a supplemental foraminous and dished bottom 42 is placed, and the two bottoms are provided with a concentrically arranged discharge opening 43 controlled by a valve 44 and provided with a discharge conduit 45. The valve is pivotally supported on lugs 46, 47 and opens downward into the conduit as in the former instance.

The supplemental bottom 42 is supported on an annular sill 7, and the filter walls 4 and 34 are formed of an inner stratum 48 of coarse material, preferably cocoa matting and an outer stratum 49 of textile material such as drilling or the like, in which the interstices are sufficiently fine to produce good filtration.

The bottom 41 is provided with a passage 50 for the filtered solvent to pass through, and in all other respects the two constructions are practically the same.

In the operation of my invention, pulp or pulverized ore and a solvent are conducted into the tank until a predetermined quantity has been deposited therein, the pulp is then directed into another tank, and the tailings in the first tank, allowed to settle or precipitate while part of the liquid is passing through the filter chambers 2 and 36. As the liquid above the tailings clarifies, it is decanted through pipes 27', 28 and 29 progressively and conducted to zinc shaving boxes, and at the same time the liquid which has passed through the filter into the chamber 11, is drawn off through pipe 24' and also conducted to the zinc shaving boxes. The precipitation of the solids in suspension may be accelerated by the application of alum, or other like chemical, and thus hasten the filtration and decantation of the solution. The solvent containing the values having been drawn off, the tailings in the tank may be washed for the recovery of the values held in suspension in the tailings, by closing the several decanting pipes 27', 28 and 29 and supplying water to the tank. It will also be found advantageous to connect the pipe 24' to a pump and exhaust the air from chamber 11 thereby filtering under a vacuum and drawing the solvent freighted with values through the tailings contained in the tank. When the discharge pipe 24' indicates that the tailings in the tank have been sufficiently drained, either in the first passage of the solvent and the values, or in subsequent washings of the tailings, the valve 25' in pipe 24' is closed, the valve 21 opened, by withdrawing bolt 23, after which the valve 14 is lowered through the medium of the shaft 16, wheel 19 and cables or chains 19', when the tailings flow out through the chamber 11, and conduit 27. The flow of the tailings may be accelerated by turning a stream of water into the tank and loosening or agitating the tailings. The discharge of the tailings having been completed, the tank may be cleansed by turning on water under pressure from a hose or any suitable source of supply. Should any stoppage occur in the flow of the tailings in their passage through the extension 8 or in the conduit 27, they may be released by a suitable implement inserted in the outlet of the conduit 27. The dished or inwardly inclined bottom 5, greatly facilitates the discharge of the tailings from the tank; and the subsequent cleansing of the latter by a stream of water, as there are no sharp angles for the tailings to lodge upon.

It is obvious that changes in details of construction may be made without departing from the spirit of my invention, for example filtering media, other than that shown may be employed by placing it upon the foraminous bottom 5, or a bottom of porous filtering material may be used.

Having thus fully described my invention, what I claim is—

1. A settling tank for treating pulp and separating a solution containing values from tailings, comprising an outer imperforate wall, and an inner filtering wall forming an annular filter chamber between said walls, a converging perforated bottom, a filtering bottom above said perforated bottom, a filter chamber formed by said bottoms, a converging solid bottom, a filtered liquid chamber between said perforated and said solid bottom, means of communication between said annular filter chamber and the latter liquid chamber, a discharge passage in the center of the tank, a valve controlling said passage for discharging tailings, means extending through the annular filter chamber for decanting clarified liquid above the tailings, and means for drawing off filtered liquid below the tailings.

2. A settling tank for treating pulp and separating a solution containing values from the tailings, provided with a concentric filter wall, an annular filter chamber, a converging filter in the bottom of the tank, a liquid receptacle below said chamber and filter, means of communication between the filter chamber and the liquid receptacle, means for decanting liquid from the tank above the tailings progressively, means for drawing off filtered liquid below the tailings, a converging bottom and means for discharging the tailings through the center of the bottom of the tank by gravity.

3. A settling tank for treating pulp and separating a solution containing values from the tailings, provided with a converging filter bottom, and an extension forming a filtered liquid receptacle between said bottom and said extension, a concentrically arranged valve in said filter bottom, means for drawing clarified liquid containing values from above and below the tailings, and a discharge valve in said extension for discharging tailings.

4. A settling tank for the purpose described, provided with a converging filtering bottom, a concentrically arranged valve in said bottom, a conical extension beyond said bottom provided with a valve whose area is equal to the area of its discharge opening for discharging tailings from the tank through said extension, and a movable support for the latter valve.

5. A tank for the purpose described having a filtering bottom converging toward its center and provided with a concentrically arranged discharge passage, a valve controlling said passage, a filtered liquid receptacle below said bottom having a central discharge passage and a valve controlling the latter passage.

6. A tank for the purpose described, having a filtering bottom inclined toward its center and provided with a concentrically arranged discharge passage, a concentrically arranged support for said bottom, a liquid receptacle below said bottom having a concentrically arranged discharge passage, and a slidable support for the latter valve.

7. A tank for the purpose described, having an annular filter chamber adjacent to its wall, a filter on its bottom, a liquid receptacle having inner and outer walls below said filters, means of communication between said filters and said receptacle, and means for discharging the tailings through said inner and outer walls of said liquid receptacle.

8. A tank for the purpose described having a converging foraminous bottom, a filtering medium supported on said bottom, an annular filtering chamber adjacent to the wall of the tank, a liquid chamber below said bottom and said annular filter chamber and adapted to receive liquid filtered through said bottom and said annular filter chamber, means for decanting liquid above the tailings, means for drawing off filtered liquid from said filter chamber, a discharge opening and a valve in the center of the foraminous bottom.

9. A tank for the purpose described provided with a concentric filtering wall, an annular chamber surrounding said wall, a foraminous bottom, a filtering medium and members above said bottom forming a plurality of chambers between said medium and said bottom, means for decanting unfiltered liquid, means for drawing off filtered liquid and means for discharging tailings by gravity.

In testimony whereof I affix my signature, in presence of two witnesses.

DAVID C. REINOHL.

Witnesses:
W. PARKER REINOHL,
FRANCIS A. REINOHL.

Copies of this patent may be obtained for five cents each, by addressing the "Commissioner of Patents, Washington, D. C."